US007174004B1

(12) United States Patent
Michaelis

(10) Patent No.: US 7,174,004 B1
(45) Date of Patent: Feb. 6, 2007

(54) NETWORK BASED METHOD AND APPARATUS FOR SUPPORTING INTEROPERABILITY BETWEEN INCOMPATIBLE TTY DEVICES

(75) Inventor: Paul Roller Michaelis, Louisville, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 481 days.

(21) Appl. No.: 10/810,239

(22) Filed: Mar. 25, 2004

(51) Int. Cl.
*H04M 11/00* (2006.01)
(52) U.S. Cl. .................. 379/52; 379/93.31; 379/93.33
(58) Field of Classification Search ................. 379/52, 379/93.31, 93.33, 93.28, 93.11, 93.26, 93.27, 379/93.29, 93.18; 340/825.19
See application file for complete search history.

(56) References Cited

OTHER PUBLICATIONS

Taskett; Methods And Apparatus for providing a prepaid remote memory customer account for the hearing impaired ; Feb. 13, 1997; WO 97/05732.*
"Access for 9-1-1 and Telephone Emergency Services," Americans with Disabilities Act, U.S. Department of Justice, Civil Rights Division (Jul. 15, 1998), available at http://www.usdoi.gov/crt/ada/911ta.htm, 11 pages.

H. Schulzrinne et al., "RFC 2833—RTP Payload for DTMF Digits, Telephony Tones and Telephony Signals," Network Working Group Request for Comments 2833 (May 2000), available at http://www.faqs.org/rfcs/rfc2833.html, 23 pages.

G. Hellstrom et al., "RFC 2793—RTP Payload for Text Consersation," Network Working Group Request for Comments 2793 (May 2000), available at http://www.faqs.org/rfcs/rfc2793.html, 8 pages.

* cited by examiner

*Primary Examiner*—Melur Ramakrishnaiah
(74) *Attorney, Agent, or Firm*—Sheridan Ross P.C.

(57) ABSTRACT

The present invention is directed to providing compatibility between teletype telephone devices. In particular, embodiments of the present invention alter the described duration of tones used to encode individual characters generated in accordance with a first protocol so that the description complies with a second protocol. Other embodiments of the present invention, in response to receiving a description of tones expressed according to a first protocol, generate tones in accordance with a second protocol. Where a protocol used by a sending device is capable of transmitting text at higher rates than a protocol used by a receiving device, the descriptions of the tones may be buffered. Embodiments of the present invention may additionally provide feedback to the users of transmitting files when data is buffered, to indicate that the transmission is in progress.

42 Claims, 5 Drawing Sheets

NETWORK BASED METHOD AND APPARATUS FOR SUPPORTING INTEROPERABILITY BETWEEN INCOMPATIBLE TTY DEVICES

FIELD OF THE INVENTION

The present invention is directed to supporting interoperability between TTY devices. In particular, the present invention is directed to supporting interoperability between TTY devices designed for use in connection with otherwise incompatible standards.

BACKGROUND OF THE INVENTION

In order to allow for people having speech and/or hearing disabilities that prevent them from using conventional telephones to communicate over the public switched telephony network, text telephones (TTY devices), also known as telecommunications devices for the deaf (TDD devices) have been developed. In general, such devices encode characters of text using sequences of audible tones. In particular, in response to receiving a command to transmit a character, a TTY device will generate a sequence of audible tones that is transmitted through the telephone network to a similar TTY device at the receiving end. The TTY device at the receiving end decodes the sequence of audible tones, and displays or otherwise outputs the encoded character.

Text telephone devices operate according to various operating protocols or standards. When a call is placed between countries or regions adhering to different protocols, standard TTY devices become inoperable. For example, in the United States, TTY devices communicate with one another using a 45.45 Baud frequency shift key protocol commonly referred to as Baudot signaling. Baudot signaling transmits characters using a sequence of seven audible tones at either 1400 Hz or 1800 Hz. In particular, a Baudot character comprises a start bit of 1800 Hz, five tones of either 1400 or 1800 Hz to signal the series of five bits specifying the character, and a stop bit of 1400 Hz. There is no error correction. At 45.45 Baud, the duration of each individual tone signaling the start tone and the five tones specifying the character is 22 milliseconds. The stop tone is often 33 milliseconds in duration, and can be 44 milliseconds.

The standard for TTY devices that is commonly employed in the United Kingdom, Ireland, Australia, and South Africa is identical to the standard used in the United States, except that the system is 50 Baud. Accordingly, tones that in the U.S. TTY protocol are 22 ms in duration are 20 ms in duration according to the U.K. protocol. This difference is sufficient to prevent devices designed to operate using one of the protocols to interoperate with devices designed to operate using the other of the protocols.

Specialized TTY devices, capable of supporting more than one communication protocol, are available. However, such devices have been much more expensive than TTY devices that support only one of the protocols. Other systems have used software solutions to translate between TTY protocols. Such systems have typically used as an intermediate step the conversion of the transmission into ASCII text. In addition to the relative complexity of such systems, this approach is vulnerable to errors. In particular, both the U.S. and the U.K.-type systems are moded, meaning that in one mode a sequence of tones may represent a letter and in another mode the same sequence of tones may represent a number. By introducing an intermediate step in which TTY tones are converted to ASCII text and then back to TTY tones, the likelihood that the two TTY devices in communication with one another will lose their mode synchronization is increased.

Therefore there remains a need for a system that is capable of translating between different TTY protocols that is reliable in operation and that is not cost prohibitive to implement.

SUMMARY OF THE INVENTION

According to embodiments of the present invention, a communication server is provided that transmits TTY signals as a description of the tones to be regenerated for the TTY device at the other end. A sending or receiving communication server may alter the description to comply with the TTY protocol used by the receiving TTY device. Accordingly, TTY devices that use otherwise incompatible TTY protocols may communicate with one another.

In accordance with embodiments of the present invention, the use of different TTY protocols by TTY devices in a communication is automatically detected. Such automatic detection may be based on records associated with communication devices at either end of the communication channel indicating the TTY protocol used by an associated TTY device, or on information received from a TTY device or its user. Such automatic detection may also be based on the telephone number or country code portion of a telephone number that is dialed at the initiation of the communication.

In accordance with further embodiments of the present invention, a user of a first TTY device that is being used to transmit characters to a second TTY device that uses a slower transmission protocol than that of the first may be provided with information regarding the status of the transmission. For example, an indication that the message is still being delivered to the recipient may be provided. By providing such an indication while buffered data is being read out to a receiving device, the sending user is assured that the connection with the second TTY device has not been lost.

Additional features and advantages of the present invention will become more readily apparent from the following discussion, particularly when taken together with the accompanying drawings.

DETAILED DESCRIPTION

Figure 1:
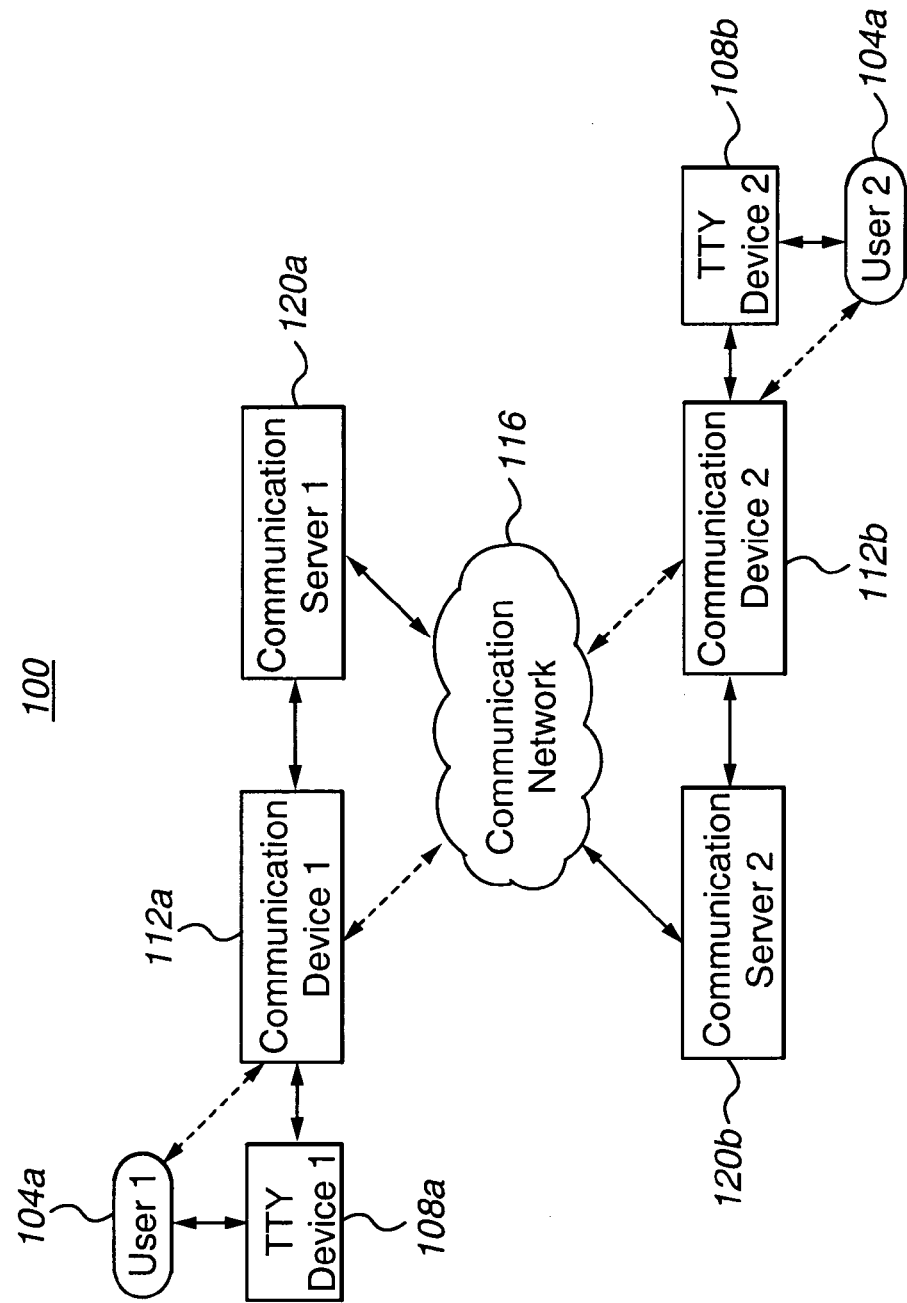
FIG. 1 is a block diagram of a communication arrangement in accordance with an embodiment of the present invention.

With reference now to FIG. 1, a communication system 100 in accordance with an embodiment of the present invention is depicted. The communication system generally includes a first user 104a associated with a first teletype (TTY) device 108a and a first communication device 112a. The first communication device 112a may be interconnected to a communication network 116 directly, or through a first communication server 120a. The communication system may also include a second user 104*b* associated with a second teletype (TTY) device 108*b* and a second communication device 112*b*. The second communication device 112*b* may be interconnected to the communication network 116 directly, or through a second communication server 120*b*. Although only two users are shown in FIG. 1, it should be appreciated that any number of users and associated devices may be included in a system 100, for example in connection with a conference call scenario.

A TTY device 108 in accordance with embodiments of the present invention may comprise any conventional TTY device. Accordingly, the implementation of embodiments of the present invention does not require users 104 to acquire new TTY devices. As can be appreciated by one of skill in the art, a TTY device 108 typically includes a keyboard for entering selected characters for transmission and a display for displaying received characters. In accordance with embodiments of the present invention, the TTY device 108 may also display transmission status information as described elsewhere herein. Likewise, a communication device 112 in accordance with embodiments of the present invention may comprise a conventional communication device, such as a standard analog or digital telephone, or an IP telephone. As can be appreciated by one of skill in the art, a TTY device 108 and a communication device 112 may also be integral to one another, rather than being implemented as separate components. In addition, a TTY device 108 may comprise an interactive voice response system or other communication node that uses a TTY protocol.

A communication server 120 in accordance with embodiments of the present invention may comprise a telecommunications server operable to interconnect analog, IP telephone, and/or digital communications devices 112 to a wider communication network 116. For example, a communication server 120 may comprise a private branch exchange (PBX) or a media server. In general, the communication server 120 interconnects one or more associated communication devices 112 to the communication network 120, either directly or through intermediate devices. In addition, a communication server 120 in accordance with embodiments of the present invention enables communications to be transmitted over the communication network 116 according to a packet data protocol, such as a voice over Internet protocol (VoIP) or some other real time protocol (RTP). The communication servers 120 may also send data packets across the communication network 116 as an RTP stream in which the TTY tones encoding characters are described (e.g., as textual description) rather than sent as the tones themselves. For example, the tones may be described according to RFC 2833, which defines the RTP payload for dual tone multiple frequency (DTMF) tones, telephony tones, and telephony signals. This avoids various problems related to packet loss and ordering often experienced in packet data communication networks 116 that would result in inaccurate reproduction of the tones and loss of encoded characters if the tones themselves were sent.

The communication network 116 may comprise a computer network or other packet data communication network. Accordingly, the communication network 116 may comprise a local area network, a wide area network, such as the Internet, or a combination of local and/or wide area networks. In addition, the communication network 116 may incorporate analog networks, such as the public switched telephone network (PSTN). Accordingly, the communication network 116 may comprise a number of networks and network types. However, according to embodiments of the present invention, the communication network 116 includes a packet data network or networks, at least proximate to the communication servers 120. In addition, it should be appreciated that the communication servers 120 may be interconnected to communication devices 112 by various network types and/or combinations.

Figure 2:
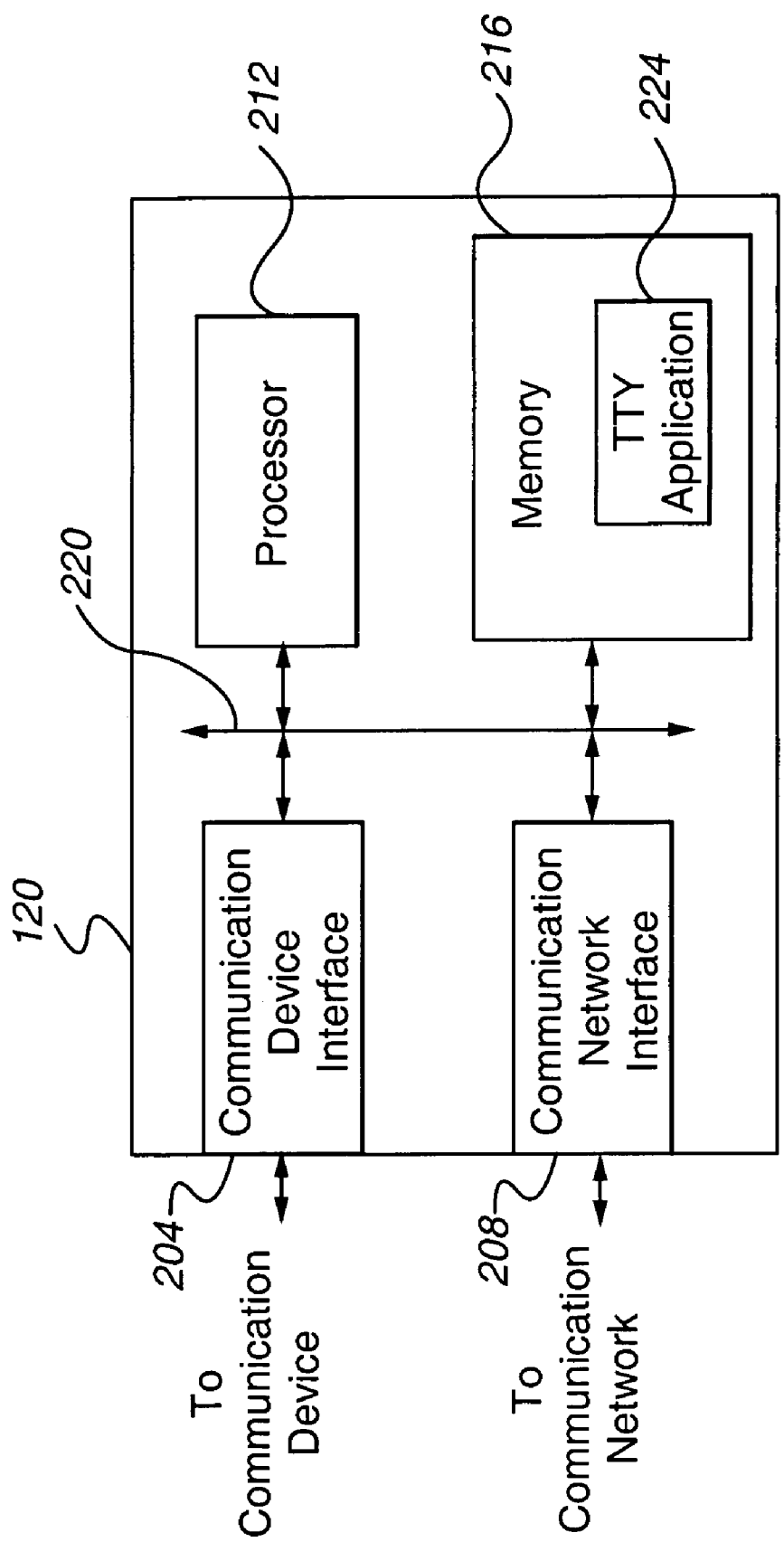
FIG. 2 is a block diagram of a communication server in accordance with an embodiment of the present invention.

With reference now to FIG. 2, components of a communication server 120 in accordance with embodiments of the present invention are illustrated in block diagram form. As shown in FIG. 2, a communication server 120 may include a number of interfaces, including a communication device interface 204 and a communication network interface 208. In addition, a communication server 120 may include a processor 212 and memory 216. The various components of the communication server 120 may be interconnected to one another by an internal bus 220.

The communication device interface 204 interconnects the communication server 120 to an associated communication device or devices 112. The communication device interface 204 type is determined by the interconnection between the communication device 112 and the communication server 120. For example, where the interconnection between the communication device 112 and the communication server 120 is a packet data type network, the communication device interface 204 may comprise a packet data interface. As a further example, where the interconnection between the communication device 112 and the communication server 120 is an analog interconnection, the communication device interface 204 may comprise a tip-ring type interface.

The communication network interface 208 interconnects the communication server 120 to the communication network 116. In accordance with embodiments of the present invention, the communication network interface 208 comprises a packet data network interface, for example to enable communications using RTP or other Internet protocols. As can be appreciated by one of skill in the art, the communication device interface 204 and the communication network interface 208 may be integral to one another, for example where the communication server 120 is in communication with a communication device 108 and the communication network 116 through the same physical interconnection.

The processor 212 generally operates to execute instructions, for example stored in associated memory 216 or memory integral to the processor 212. Accordingly, the processor 212 may comprise a general purpose programmable processor, digital signal processor or controller. In a further aspect, the processor 212 may implement functions in accordance with embodiments of the present invention described herein.

The memory 216 may store instructions for controlling the operation of the processor. For example, the memory 216 may store a TTY application 224 containing instructions that, when executed by the processor 212, perform functions in accordance with embodiments of the present invention. In addition or alternatively, the memory 216 may store data. The memory 216 may comprise any computer data storage device, such as solid state memory, a hard disk drive, or read only memory. As can be appreciated by one of skill in the art, the processor 212 and memory 216 may also be implemented as an integrated controller type device.

In general, rather than transmit the actual tones via audio channels, embodiments of the present invention involve the transmission of TTY characters as verbal descriptions of the tones encoding each TTY character selected by a user for transmission, with an instruction to reconstruct the tone at the receiving end. Accordingly embodiments of the present invention generate the descriptions of the tones encoding selected characters for transmission over an RTP data channel. As can further be appreciated by one of skill in the art, the use of descriptions of the tones encoding a character, rather than transmission of audio packets encoding the tones themselves, avoids problems related to packet loss and to voice optimized audio compression in IP networks that would otherwise result in the loss of entire characters.

For example, the initial tone of a character from a first TTY device 108a using the U.K. standard, which will always be a tone of 1800 Hz for 20 ms, is detected by the TTY application 224 running in the first communication server 120a proximate to the sending device TTY device 108a, and is transmitted as a command to generate an audio tone of 1800 Hz for a specified period of time. A communication server 120 having enhanced TTY protocol interoperability as described herein, either the first communication server 120a or the second communication server 120b, that has information regarding the standard applied by the receiving TTY device 108 (e.g., the second TTY device 108b) can alter the description of the tone. For example, where the receiving TTY device 108b uses the U.S. standard, according to which the start tone is 1800 Hz for 22 ms, the communication server 120 having enhanced TTY protocol interoperability can alter the time duration parameter of the command to generate the audio tone. Specifically, the time duration parameter can be increased by 10%. Alternatively, the time duration parameters can be overridden to those that the communication server 120 having enhanced TTY protocol interoperability knows are correct. As can be appreciated by one of skill in the art from the description provided herein, this operation can also be performed in the reverse direction, according to which the duration of tones is decreased, for transmissions from, for example, a TTY device using the U.S. standard to a TTY device using the U.K. standard. As can also be appreciated by one of skill in the art from the description provided herein, this technique can be extended to allow interoperability between TTY systems that use different tone frequencies, as well as different tone durations.

Figure 3:
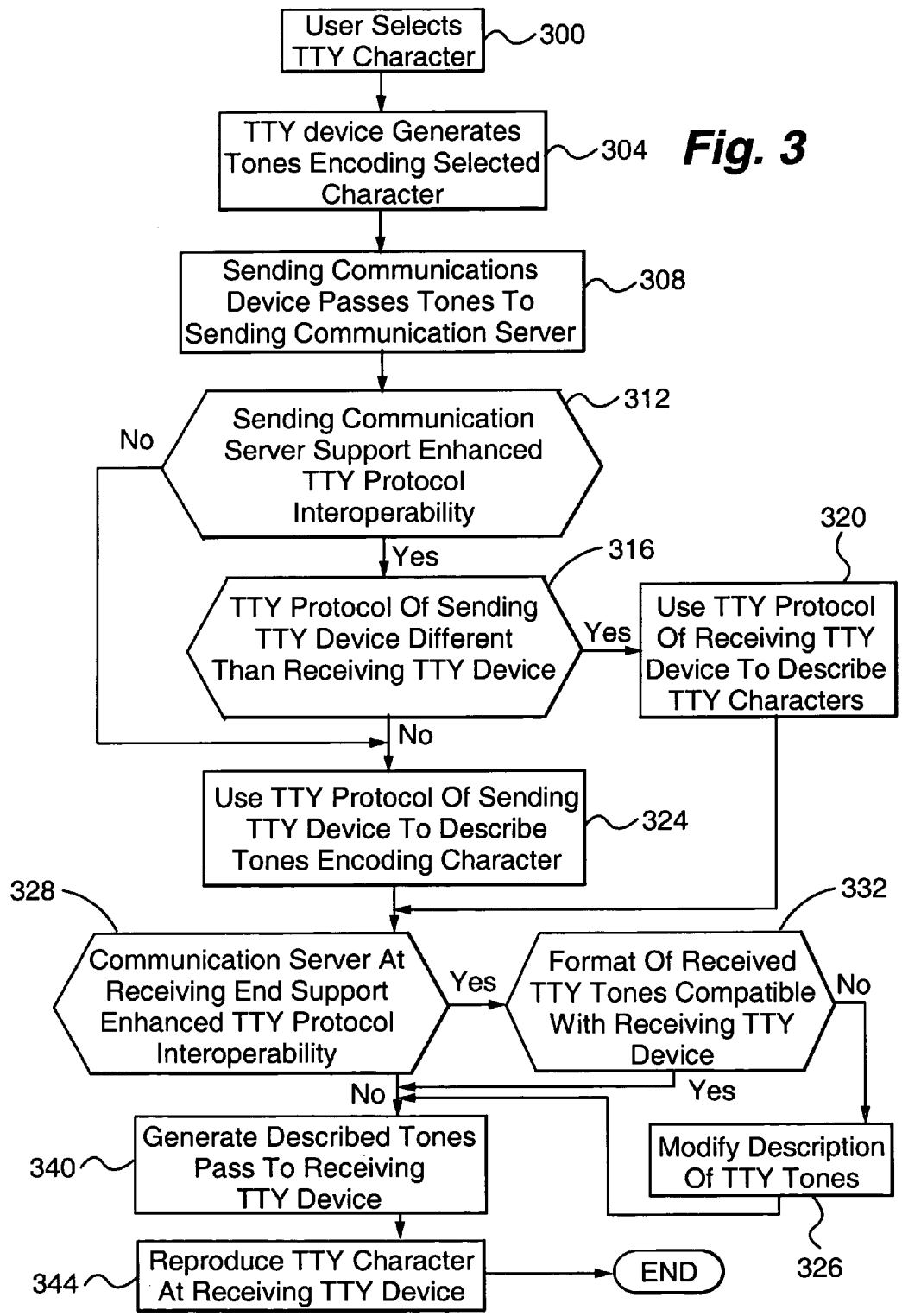
FIG. 3 is a flowchart depicting aspects of the operation of embodiments of the present invention.

With reference now to FIG. 3, aspects of the operation of embodiments of the present invention are illustrated. As can be appreciated by one of skill in the art and from the description provided herein, aspects of the operation of a system 100 in accordance with embodiments of the present invention may be controlled by a TTY application 224 running on one or more communication servers 120. Initially, at step 300, a user (for example the first user 104a) of a TTY device (for example the first TTY device 108a) selects a TTY character for transmission across a communication channel established over the communication network 116. The TTY device 108 then generates tones (i.e. Baudot signaling tones) encoding the selected character (step 304). The sending communications device (for example first communications device 112a) then passes the tones to the sending communication server (for example the first communication server 120a)(step 308). As can be appreciated by one of skill in the art, the format according to which the tones encoding the character are passed to the communications server 120 is determined by the protocol of the interconnection between the communication server 120 and the communication device 112.

At step 312, the communication server 120 recognizes the received tones (or the first tone, the start tone) as a TTY character, and a determination is made as to whether the sending communication server 120 supports enhanced TTY protocol interoperability as described herein. If enhanced TTY protocol interoperability is supported, a determination is made as to whether the protocol used by the sending TTY device to encode the selected character is different than that used by the receiving TTY device (for example second TTY device 108b)(step 316). If the protocols used by the TTY devices 108 to encode characters are different, the sending communications server 120, having been determined to support enhanced TTY protocol interoperability, will use the TTY protocol of the receiving TTY device 108 (step 320). In particular, the sending communications server 120 describes the tones encoding the selected character according to the protocol used by the receiving TTY device 108. As an example, if the sending TTY device 108 uses a 50 Baud TTY protocol and the receiving TTY device 108 uses a 45.45 Baud TTY protocol, the communication server will describe the tones according to the 45.45 Baud TTY protocol. In particular, instead of transmitting a description of the tones encoding the selected character according to which each of the first six tones of a character is 20 ms in length and the stop tone is (for example) 30 ms in length, each of the first six tones will be described as being 22 ms in length and the stop tone will be described as being (for example) 33 ms in length.

If the TTY protocol of the sending TTY device 108 is not different from that of the receiving TTY device, or if the sending TTY device 108 cannot determine whether the TTY protocol of the receiving TTY device is different, the TTY protocol of the sending TTY device 108 is used to describe the tones encoding the selected character (step 324). The TTY protocol of the sending TTY device 108 is also used to describe the tones encoding the selected character if at step 312 it was determined that the sending TTY device 108 does not support enhanced TTY protocol interoperability as disclosed herein.

After formatting a description of the characters according to the parameters of a TTY protocol at steps 320 or 324 the description is sent, and a determination is made as to whether the communication server 120 at the receiving end supports enhanced TTY protocol interoperability as disclosed herein (step 328). If the communication server 120 at the receiving end supports enhanced TTY protocol interoperability, a determination is next made as to whether the format of the described TTY tones is compatible with the protocol used by the receiving TTY device 108 (step 332). If the format of the described TTY tones is not compatible with the protocol used by the receiving TTY device 108, the receiving communication server 120 modifies the description of the TTY tones so that they are compatible with the receiving device (step 336).

After determining that the receiving server 120 does not support enhanced TTY protocol interoperability (at step 328), determining that the format according to which the TTY tones are described is compatible with the receiving TTY device 108 (at step 332), or modifying the description of the TTY tones so that they are compatible with the protocol used by the receiving device, the process continues to step 340. At step 340, the receiving communication server 120 generates the described tones and passes them to the receiving TTY device. The receiving TTY device then reproduces the TTY character encoded by the received tones for viewing by the user 104 at the receiving end (step 344).

As can be appreciated by one of skill in the art, both communication servers 120 in a point to point communication may provide enhanced TTY protocol interoperability, but only one communication server 120 is required to have the enhanced TTY protocol interoperability. Furthermore, where both communications servers 120 are capable of providing enhanced TTY protocol interoperability, if the communication server proximate the sending end has described the TTY tones in terms of the protocol used by the receiving TTY device 108, the communication server 120 at the receiving end can simply generate the TTY tones according to the received description without modification.

As can be appreciated by one of skill in the art, with reference to the description provided herein, where TTY characters are being passed between TTY devices 108 that use different Baud rates, the descriptions of tones sent by the faster rate TTY device 108 will need to be temporarily stored or buffered. A buffer may therefore be provided by either a sending end or receiving end communication server 120, for example in the memory 216 provided as a part of the communication server. The communication server 120 providing the buffer need not be the server that determines that the TTY protocols used by the sending and the receiving TTY devices 108 are different and adjusts the descriptions of the TTY tones to accommodate the receiving TTY device 108.

In addition, it can be appreciated by one of skill in the art, a user 104 often can enter characters into a TTY device faster than they can be transmitted using TTY protocols. Accordingly, a user 104 will typically experience silence or the absence of return TTY characters after sending a group of characters. This is particularly true where a user 104 is sending characters from a faster rate TTY device 108 to a slower rate TTY device 104, because it will take more time for the slower rate TTY device 108 to receive the TTY tones and display the encoded characters than it does for the sending TTY device 108 to receive characters from the user 104 and generate the TTY tones. Furthermore, the text displayed by the transmitting TTY device 108 is locally generated, and is not echoed by the receiving TTY device 108, and therefore does not provide an indication that the text has been successfully received at the receiving end. Therefore, in order to assure the sending user 104 that the line has not been disconnected, embodiments of the present invention provide feedback to the sending user of the status of the transmission.

Figure 4:
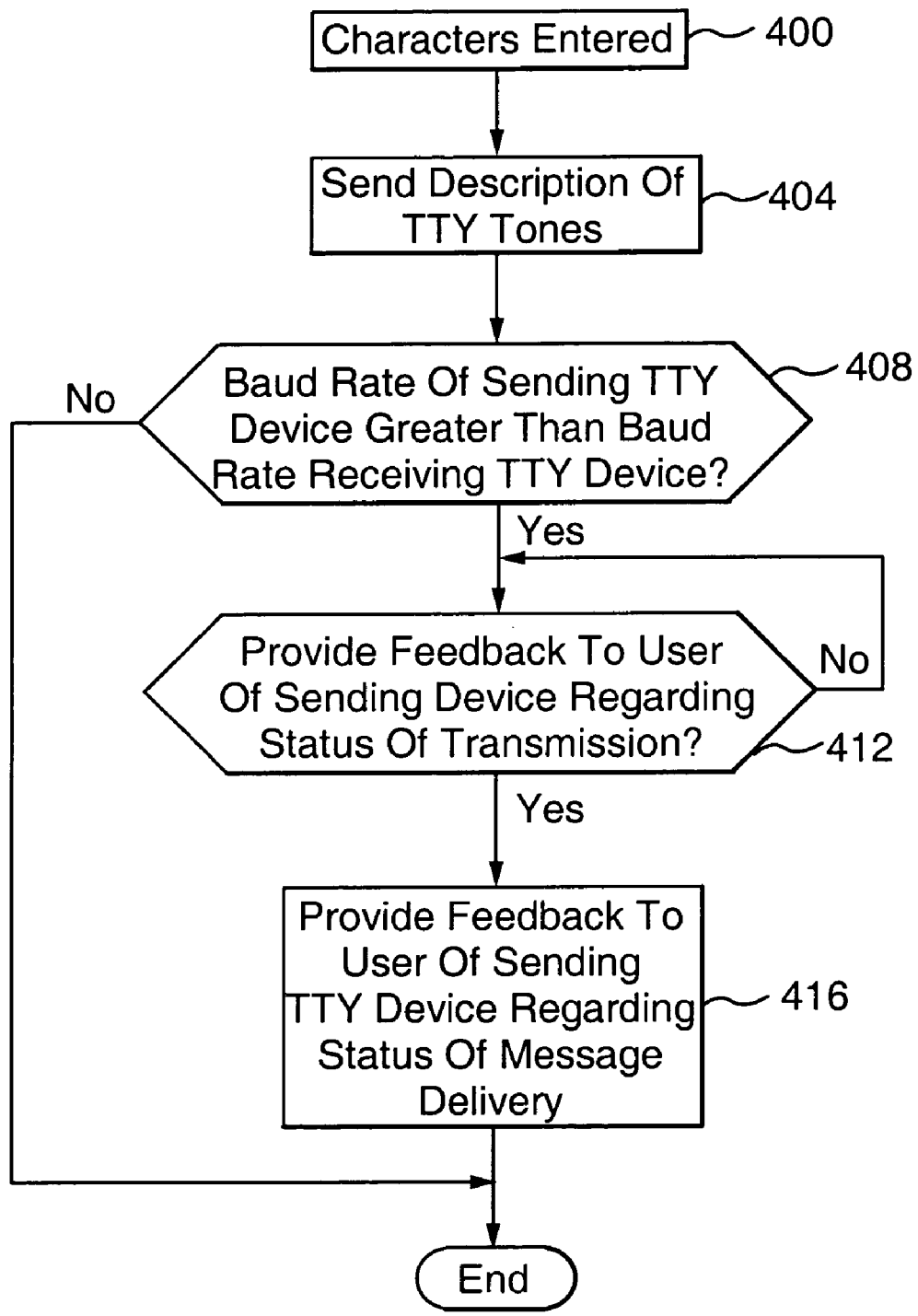
FIG. 4 is a flowchart depicting other aspects of the operation of embodiments of the present invention.

With reference now to FIG. 4 a process for providing feedback to a user 104 of a faster rate TTY device 108 regarding the status of a transmission is illustrated. Initially, at step 400 characters are entered by the user 104 of a sending TTY device 108. A description of the tones produced by the sending TTY device 108 is then constructed and sent by the sending communication server 120 across the communication network 116 (step 404). At step 408, a communication server 120 determines whether the Baud rate of the sending TTY device 108 is greater than the Baud rate of the TTY device 108 at the receiving end. In accordance with embodiments of the present invention, this determination can be made by any communication server 120 involved in transmitting the entered TTY tones that has enhanced TTY protocol interoperability features as described herein. If the Baud rate of the sending TTY device is not determined to be faster than the Baud rate of the receiving TTY device, the process ends.

If the Baud rate of the sending TTY device 108 is determined to be faster than that of the receiving TTY device 108, a determination is made as to whether feedback should be provided to the user 104 of the sending TTY device 108 regarding the status of the transmission (step 412). This determination may be made by the same communication server 120 that determined that the Baud rates of the TTY devices 108 involved in the communication were different, or by another communication server 120 having enhanced TTY protocol interoperability features. In order to make this determination, the communication server 120 may monitor the input of the sending user 104 and determine that characters are being entered at the sending TTY device 108 faster than they can be displayed at the receiving TTY device 108. As another technique, the communication server 120 may detect that the entry of a message segment is complete, for example by detecting an extended pause in the entry of characters at the sending TTY device 108 or by detecting the characters "GA," the standard abbreviation among TTY users for "Go Ahead, I'm done, it's your turn."

If it is determined that feedback should be provided, the feedback is provided to the user 104 of the sending TTY device 108 (step 416), otherwise the process may idle at step 412. The feedback provided may be in the form of a message displayed by the sending TTY device 108. In accordance with embodiments of the present invention, the message may simply indicate that delivery of the message is in progress. In accordance with further embodiments of the present invention, the message may indicate an estimated time until all of the characters included in the message segment have been displayed by the receiving TTY device 108.

Figure 5:
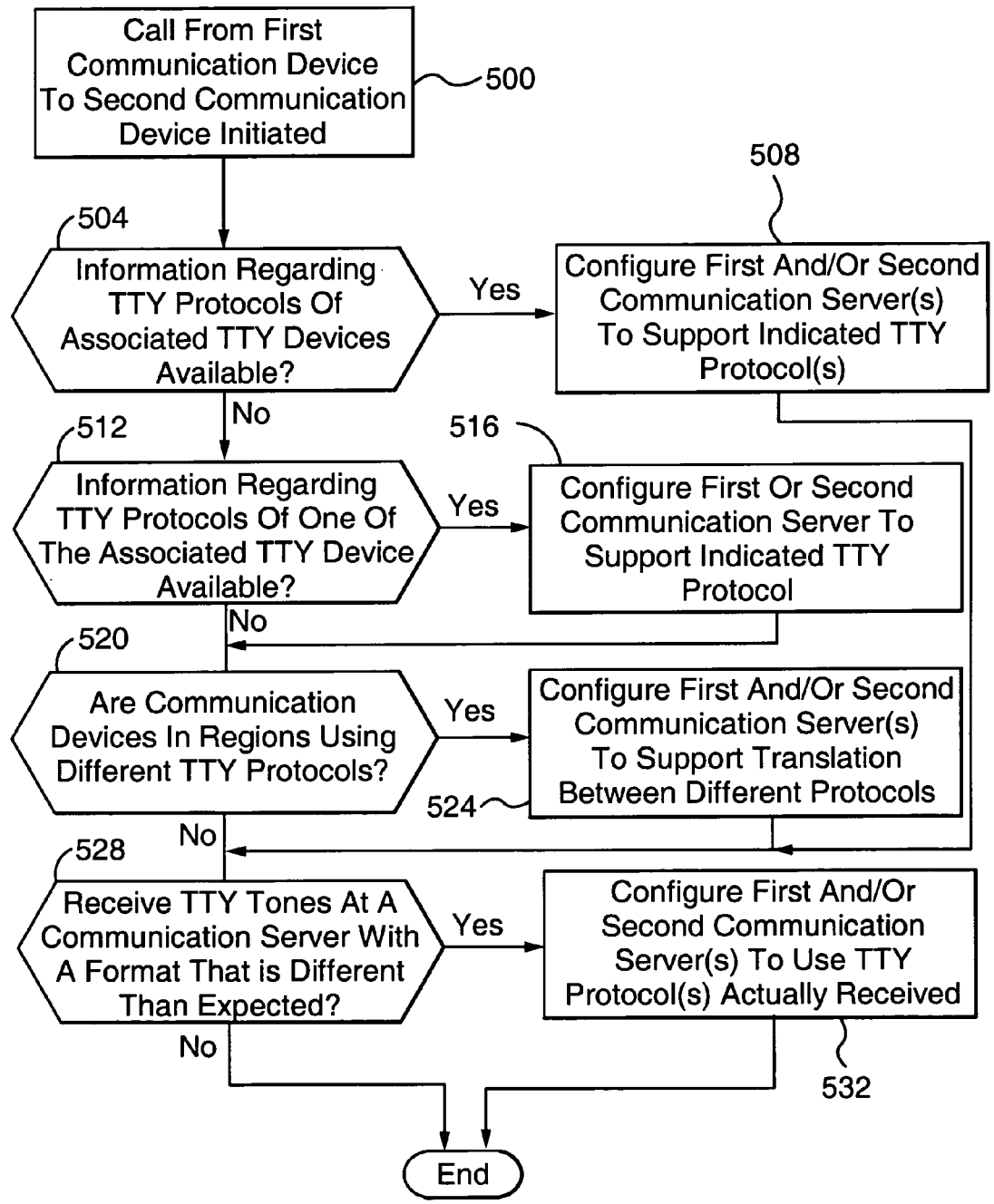
FIG. 5 is a flowchart depicting other aspects of the operation of embodiments of the present invention.

With reference now to FIG. 5, a process for selecting an appropriate TTY protocol in accordance with embodiments of the present invention is illustrated. Initially, at step 500, a call from a first communication device 112a to a second communication device 112b is initiated. A determination is then made as to whether information regarding the TTY protocols used by both of the TTY devices 108 associated with the communication devices is available (step 504). Such information may be obtained from records stored or maintained in a communication server or servers 120, or in network switches or servers accessible to a communication server 120. As a further example, a communication device 112 and/or an associated TTY device 108 may generate a signal indicating the TTY protocol used by the TTY device. If information on both TTY devices 108 is available, the first and/or second communication servers 120 are configured to support the TTY protocol or protocols indicated by the information (step 508). That is, at least one communication server 120 having enhanced TTY protocol interoperability as described herein is configured to describe the TTY tones according to the protocol of the receiving TTY device 108, which may or may not be different than the description of the tones received by the communication server 120. Accordingly, the communication server 120 at the receiving end, whether or not it is the communication server 120 having enhanced TTY protocol interoperability that is configured to ensure the correct TTY protocol is used, generates TTY tones as required by the receiving TTY device 108.

If information regarding both of the TTY devices 108 is not available, a determination is made as to whether information regarding the TTY protocol of one of the TTY devices 108 is available (step 512). If such information is available, the first or second communication server 120 is configured to support the TTY protocol of the one TTY device as indicated by the available information (step 516).

If there is no information for the TTY devices, or after configuring one of the communications servers 120 to support a TTY device 108 for which information is available at step 516, a determination is made as to whether the first and second communication devices 112 are located in or associated with regions that use different TTY protocols (step 520). If the communication devices 112 are located in or associated with regions using different TTY protocols, the first and/or second communication server 120 is configured to support translation between the different TTY protocols (step 524). The location of the communication devices 112 may be derived from the addresses associated with the communications devices 112. For example, the country code portion of telephone numbers associated with the devices may be used to derive location information. As can be appreciated by one of skill in the art and from the description provided herein, where a record is available for one of the communication devices 112, one of the communication servers 120 may be configured to ensure that the TTY tones that will be provided are generated as required by the TTY device 108 associated with that one communication device 108.

After configuring a server or servers 120 at step 508 or 524, or after determining that the communication devices 112 are not in regions using different TTY protocols, a determination is made as to whether a communication server 120 receives TTY tones from a TTY device 108 according to a protocol other than the protocol indicated by received information or by the location of the communication device 112 (step 528). If tones formatted according to an unexpected TTY protocol are received, the configuration of the communication server or servers 120 is revised to use the TTY protocol actually received when communicating with that TTY device 108 (step 532). After a determination that the TTY tones actually received are not in a format that is different than expected, or after configuring the communication server or servers 120 to use the protocol or protocols actually received, the process ends.

As can be appreciated by one of skill in the art from the description provided herein, embodiments of the present invention allow translations between incompatible TTY protocols to be made using software or firmware running in a communication server 120. Accordingly, the present invention provides for interoperability between otherwise incompatible TTY devices 108 using a centralized solution. That is, embodiments of the present invention allow translation mechanisms to be located in communication servers 120, allowing TTY devices 108 to interoperate, without requiring TTY devices 108 themselves to support more than one TTY protocol.

As can also be appreciated by one of skill in the art from the description provided herein, translations between different TTY protocols are effected by describing received tones according to the protocol of a TTY device 108 that will be provided with the described tones, or by altering received descriptions of TTY tones so that they are in accordance with the protocol of the TTY device that will be provided with the described tones.

In addition, it can be appreciated that embodiments of the present invention provide for feedback to the user of a TTY device 108 having a higher effective transmission rate or Baud rate in communication with a TTY device 108 having a lower effective transmission rate or Baud rate regarding the status of the transmission. Accordingly, the user is assured that the communication channel has not been discontinued during delays due to the buffering of TTY tones.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments with various modifications required by their particular application or use of the invention. It is intended that the appended claims be construed to include the alternative embodiments to the extent permitted by the prior art.

What is claimed is:

1. A computational component for performing a method, the method comprising:
   detecting tones comprising a first TTY character, said tones generated by a first TTY device according to a first TTY protocol;
   determining whether a duration of said detected tones express a TTY protocol that is incompatible with a TTY protocol used by a receiving second TTY device; and
   in response to determining that said second TTY device uses a second TTY protocol that is incompatible with said first TTY protocol, describing a duration of said detected TTY tones in a format that is compatible with said second TTY protocol.

2. The method of claim 1, further comprising, in response to said determining that said second TTY device uses a second TTY protocol that is incompatible with said first TTY protocol, describing a frequency of said detected TTY tones in a format that is compatible with said second TTY protocol, wherein said described frequency is the same as a frequency of said detected TTY tones.

3. The method of claim 1, wherein said first TTY protocol is capable of transmitting characters at a faster rate than said second TTY protocol, wherein said first TTY device is capable of receiving and transmitting characters at a faster rate than said second TTY device can receive and display said transmitted characters, said method further comprising:
   transmitting at least said first TTY character as a description of said detected TTY tones from said first TTY device to said second TTY device; and
   buffering at least said first TTY character transmitted by said first TTY device.

4. The method of claim 3, further comprising:
   displaying a message to a user of said first TTY device indicating that delivery of said transmission of at least said first TTY character to said second TTY device is in progress.

5. The method of claim 4, wherein said displaying a message to a user of said first TTY device indicating that delivery of said transmission of at least said first TTY character to said second TTY device is in progress is generated in response to detection of a "go ahead" message entered at said first TTY device.

6. The method of claim 4, wherein said displaying a message to a user of said first TTY device indicating that delivery of said transmission of at least said first TTY character to said second TTY device is in progress is generated in response to detection of a pause in an entry of characters at said first TTY device.

7. The method of claim 4, further comprising:
   determining an amount of time required to complete delivery of said transmission of a group of characters, wherein said displaying a message to a user of said first TTY device indicating that a delivery of said transmission of at least said first TTY character to said second TTY device is in progress comprises displaying a message providing an estimate of an amount of time until all of said group of characters can be displayed at said second TTY device.

8. The method of claim 3, wherein said buffering is performed proximate to one of said sending TTY device and said receiving TTY device.

9. The method of claim 1, wherein said first TTY protocol comprises a 50 Baud TTY protocol and said second TTY protocol comprises a 45.45 Baud TTY protocol.

10. The method of claim 1, wherein said detecting tones comprising a first TTY character comprises detecting a description of said tones.

11. The method of claim 1, wherein said first and second TTY protocols comprise half duplex protocols that do not provide for handshaking procedures, carrier tones, or error correction.

12. The method of claim 1, wherein said computational component comprises a computer readable storage medium containing instructions for performing the method.

13. The method of claim 1, wherein said computational component comprises a logic circuit.

14. A system capable of supporting incompatible TTY communication protocols, comprising:
  means for receiving a first selected character and for generating a first sequence of tones encoding said first selected character in accordance with a first TTY protocol;
  means for receiving a second sequence of tones encoding said first selected character in accordance with a second TTY protocol, wherein a duration of at least some tones included in said second sequence of tones is different than the duration of at least some tones included in said first sequence of tones;
  means for expressing each tone within said first sequence of tones as a description including a tone frequency and a tone duration;
  means for determining that said first TTY protocol is incompatible with said second TTY protocol; and
  means for translating said description of said first sequence of tones from said first TTY protocol to said second TTY protocol by altering said tone duration component of said description, wherein said described tone frequency is not altered.

15. The system of claim 14, wherein said tone duration according to said first TTY protocol is less than a tone duration of a corresponding tone according to said second TTY protocol, said system further comprising:
  means for buffering said first sequence of tones.

16. The system of claim 15, further comprising:
  means for indicating to a user of said first TTY device that a delivery of a transmission of said first selected character is in progress.

17. A method for enabling interoperability between different character transmission protocols, comprising:
  detecting a first sequence of tones expressing a first character;
  determining that a sending device uses a protocol for expressing characters that is different than a protocol for expressing characters that is used by a receiving device; and
  generating a description of said first sequence of tones, wherein said description of said tones includes a description of a frequency and a duration of each tone in said first sequence of tones, wherein said frequency and said duration of each tone is expressed according to said protocol used by said receiving device, wherein a duration of at least a first tone included in said first sequence of tones is described as being different than a detected duration of said at least a first tone.

18. The method of claim 17, further comprising:
  transmitting said description of said first sequence of tones expressed according to said protocol used by said receiving device.

19. The method of claim 17, further comprising:
  buffering said description of said first sequence of tones, wherein said protocol used by said sending device requires less time to transmit a character than a protocol used by said receiving device.

20. The method of claim 19, wherein said buffering is performed in a sending communication server.

21. The method of claim 19, wherein said buffering is performed in a receiving communication server.

22. The method of claim 17, further comprising providing a signal to a user of said first device indicating that delivery of a transmission of a message comprising said first character is in progress.

23. The method of claim 22, wherein said signal indicating that delivery of a transmission of a message comprising said first character to second TTY device is in progress is provided in response to detecting a pause in an entry of characters for transmission at said first device of at least a first length.

24. The method of claim 22, wherein said signal indicating that delivery of a transmission of a message comprising said first character is in progress is provided in response to detecting a go ahead signal entered at said first device.

25. The method of claim 17, wherein said determining that a sending device uses a protocol for expressing characters that is different than a protocol for expressing characters that is used by a receiving device is performed by a sending communication server, and wherein said generating a description of said first sequence of tones expressed according to said protocol used by said receiving device is performed by said sending communication server.

26. The method of claim 17, wherein said determining that a sending device uses a protocol for expressing characters that is different than a protocol for expressing characters that is used by a receiving device is performed by a receiving communication server, and wherein said generating a description of said first sequence of tones expressed according to said protocol used by said receiving device is performed by said receiving communication server.

27. A system for facilitating transmission of characters between
  communication devices, comprising:
  a first TTY device, wherein said first TTY device is operable to transmit and receive characters according to a first TTY protocol;
  a first communication server, wherein said first TTY device is interconnected to said first communication server, and wherein each tone within a sequence of tones encoding a character and received from said first TTY device is expressed as a description of tone frequency and duration;
  a second TTY device, wherein said second TTY device is operable to transmit and receive characters according to a second TTY protocol;
  a second communication server, wherein said second TTY device is interconnected to said second communication server, and wherein each tone within a sequence of received tones is provided to said second TTY device at a frequency and duration required by said second TTY protocol;
  a communication link interconnecting said first and second communication servers, wherein one of:
    1) in response to said first communication server determining that said first TTY protocol is different than said second TTY protocol, said first communication server describes each tone within said sequence of tones at a frequency and duration required by said second TTY protocol, wherein a duration of at least some of said tones required by said first protocol is different than said duration required by said second protocol, and 2) in response to said second communication server receiving a description of said tones within said sequence of tones according to said first TTY protocol, said second communication server provides said tones to said second TTY device at said frequency and duration required by said second TTY protocol, wherein a duration of at least some of said tones is different than a duration indicated by said received description of said tones.

28. The system of claim 27, further comprising a buffer, wherein descriptions of tones are temporarily stored in order to adapt transmission rates of said first and second TTY devices to one another.

29. The system of claim 28, wherein said buffer is provided as part of at least one of said first and second communication servers, and wherein feedback regarding a status of a transmission is provided to a user of one of said first and second TTY device.

30. A computational component for performing a method, the method comprising:
  detecting a first set of tones comprising a first TTY character, said tones generated by a first TTY device according to a first TTY protocol;
  determining that a receiving second TTY device uses a second TTY protocol that is incompatible with said first TTY protocol; and
  generating a second set of tones comprising said first TTY character, wherein said second set of tones are generated according to said second TTY protocol.

31. The method of claim 30, wherein said detecting a first set of tones comprising a first TTY character comprises receiving a description of a first set of tones comprising a first TTY character.

32. The method of claim 30, wherein said generating a second set of tones is performed in response to receiving a description of said first set of tones in accordance with said first TTY protocol.

33. The method of claim 30, further comprising:
  providing said second set of tones to a second TTY device.

34. The method of claim 30, further comprising:
  buffering at least some of said first set of tones comprising said first TTY character.

35. The method of claim 30, further comprising:
  providing an indication to a user of said first TTY device that a delivery of said first set of tones comprising said first TTY character is in progress.

36. The method of claim 35, wherein said indication is provided in response to detection of a "go ahead" message entered at said first TTY device.

37. The method of claim 35, wherein said indication is provided in response to detection of a pause in an entry of characters at said first TTY device.

38. The method of claim 30, wherein said computational component comprises a computer readable storage medium containing instructions for performing the method.

39. The method of claim 30, wherein said computational component comprises a logic circuit.

40. A system for enabling interoperability between TTY devices, comprising:
  a first TTY device, wherein said first TTY device is operable to transmit and receive characters according to a first TTY protocol;
  a first communication server, wherein said first TTY device is interconnected to said first communication server, and wherein each tone within a sequence of tones encoding a character that is received from said first TTY device is expressed as a description of tone frequency and duration according to said first TTY protocol;
  a second TTY device, wherein said second TTY device is operable to transmit and receive characters according to a second TTY protocol; and
  a second communication server, wherein said first communication server is interconnected to said second communication server, wherein said second TTY device is interconnected to said second communication server, and wherein each tone within a sequence of received tones is provided to said second TTY device at a frequency and duration according to said second TTY protocol.

41. The system of claim 40, further comprising a buffer, wherein descriptions of tones are temporarily stored in order to adapt transmission rates of said first and second TTY devices to one another.

42. The system of claim 41, wherein said buffer is provided as part of at least one of said first and second communication servers, and wherein feedback regarding a status of a delivery of a character is provided to a user of one of said first TTY device and said second TTY device.

* * * * *